United States Patent
Delevati

(10) Patent No.: US 12,065,559 B2
(45) Date of Patent: Aug. 20, 2024

(54) POLYMERIC COMPOSITIONS FOR FOOTWEAR

(71) Applicant: Braskem S.A., Camaçari (BR)

(72) Inventor: Giancarlos Delevati, São Paulo (BR)

(73) Assignee: Braskem S.A., Camaçari (BR)

( * ) Notice: Subject to any disclaimer, the term of this patent is extended or adjusted under 35 U.S.C. 154(b) by 482 days.

(21) Appl. No.: 16/769,968

(22) PCT Filed: Dec. 4, 2018

(86) PCT No.: PCT/IB2018/001373
§ 371 (c)(1),
(2) Date: Jun. 4, 2020

(87) PCT Pub. No.: WO2019/111047
PCT Pub. Date: Jun. 13, 2019

(65) Prior Publication Data
US 2020/0407539 A1 Dec. 31, 2020

Related U.S. Application Data

(60) Provisional application No. 62/594,307, filed on Dec. 4, 2017.

(51) Int. Cl.
| | | |
|---|---|---|
| *C08J 9/00* | (2006.01) | |
| *C08J 9/10* | (2006.01) | |
| *C08K 3/22* | (2006.01) | |
| *C08K 3/26* | (2006.01) | |
| *C08K 5/103* | (2006.01) | |
| *C08K 5/14* | (2006.01) | |
| *C08K 5/23* | (2006.01) | |
| *C08L 23/08* | (2006.01) | |
| *C08L 83/04* | (2006.01) | |

(52) U.S. Cl.
CPC ......... *C08L 23/0853* (2013.01); *C08J 9/0061* (2013.01); *C08J 9/0066* (2013.01); *C08J 9/103* (2013.01); *C08K 3/22* (2013.01); *C08K 3/26* (2013.01); *C08K 5/103* (2013.01); *C08K 5/14* (2013.01); *C08K 5/23* (2013.01); *C08L 23/0815* (2013.01); *C08J 2207/00* (2013.01); *C08J 2323/08* (2013.01); *C08J 2483/04* (2013.01); *C08K 2003/2296* (2013.01); *C08K 2003/265* (2013.01); *C08L 83/04* (2013.01)

(58) Field of Classification Search
CPC .. C08L 23/0853; C08L 23/0815; C08L 83/04; C08L 2205/025; C08J 9/0061; C08J 9/0066; C08J 9/103; C08J 2207/00; C08J 2323/08; C08J 2483/04; C08K 3/22; C08K 3/26; C08K 5/103; C08K 5/14; C08K 5/23; C08K 2003/2296; C08K 2003/265
See application file for complete search history.

(56) References Cited

U.S. PATENT DOCUMENTS

| | | | | |
|---|---|---|---|---|
| 4,338,271 | A * | 7/1982 | Kumaska | C08J 9/0061 264/DIG. 18 |
| 6,111,020 | A * | 8/2000 | Oriani | C08L 23/08 525/193 |
| 6,414,047 | B1 * | 7/2002 | Abe | C08J 9/107 521/142 |

FOREIGN PATENT DOCUMENTS

| | | | |
|---|---|---|---|
| BR | 12012025160 | A2 | 11/2013 |
| JP | 08193141 | * | 7/1996 |
| KR | 20010089936 | * | 10/2001 |
| WO | 9319118 | A2 | 9/1993 |

OTHER PUBLICATIONS

International Search Report issued in corresponding International Application No. PCT/IB2018/001373, mailed Apr. 15, 2019 (5 pages).
Written Opinion issued in corresponding International Application No. PCT/IB2018/001373, mailed Apr. 15, 2019 (8 pages).

* cited by examiner

*Primary Examiner* — Terressa Boykin
(74) *Attorney, Agent, or Firm* — Osha Bergman Watanabe & Burton LLP

(57) ABSTRACT

Polymer compositions may include an elastomeric ethylene-vinyl acetate (EVA) composition; and one or more selected from base polymer, filler, peroxide agent, blowing agent, and blowing accelerator. Methods may include blending a polymer composition from a mixture of an elastomeric ethylene-vinyl acetate (EVA) composition, and one or more of base polymer, filler, peroxide agent, blowing agent, and blowing accelerator, wherein the elastomeric EVA composition has a melt flow index (MFI) at 190° C. and 2.16 kg as determined according to ASTM D1238 in the range of 6.1 g/10 min and 45 g/10 min.

18 Claims, No Drawings

POLYMERIC COMPOSITIONS FOR FOOTWEAR

BACKGROUND

Commercial rubber compositions may be formulated with a variety of primary and secondary polymers and various additives to tune performance based on the final application. For example, rubber compositions that are normally used in the footwear market require a large number of raw materials in order to achieve the attributes necessary for the application, leading to the production of complex and specialized mixtures.

In addition to complex formulations containing a number of additives, curing and vulcanization may create further constraints, limiting the ability to change formulations or reuse rubbers for different applications. The processing difficulty with traditional rubber bases such as SBR (styrene-butadiene rubber), natural rubber and/or blends of different synthetic or natural rubbers, has motivated the search for alternative base materials having similar or improved properties, such as low abrasion, soft touch and lightness, and a reduced number of formulation components.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate polymer compositions that may include an elastomeric ethylene-vinyl acetate (EVA) composition; and one or more selected from base polymer, filler, peroxide agent, blowing agent, and blowing accelerator, wherein the elastomeric EVA composition has a melt flow index (MFI) at 190° C. and 2.16 kg as determined according to ASTM D1238 in the range of 6.1 g/10 min and 45 g/10 min.

In another aspect, methods may include blending a polymer composition from a mixture of an elastomeric ethylene-vinyl acetate (EVA) composition, and one or more of base polymer, filler, peroxide agent, blowing agent, and blowing accelerator.

Other aspects and advantages of the claimed subject matter will be apparent from the following description and the appended claims.

DETAILED DESCRIPTION

In one aspect, embodiments disclosed herein relate to tunable rubber compositions containing elastomeric ethylene vinyl acetate (EVA) composition that may be formulated with a number of additional polymers and additives to produce elastomeric materials suited for a number of diverse applications.

Polymer compositions in accordance with the present disclosure may be used for the partial or total replacement of rubbers such as styrene-butadiene rubber to prepare expanded and non-expanded articles in applications including shoe sole components, monobloc expanded soles for sandals or flip-flops, and the like, while retaining the required technical requirements demanded by these applications.

Polymer compositions in accordance with the present disclosure may include the reaction products obtained from a mixture of: an elastomeric EVA composition; a base polymer; and one or more of filler, blowing agent, curing agent, or blowing accelerator. Each of the components are discussed in turn as follows.

Elastomeric EVA Composition

Polymeric compositions in accordance to the present disclosure may include an elastomeric ethylene vinyl acetate (EVA) composition prepared from mixtures of (A) EVA copolymer, (B) ethylene alpha-olefin copolymer, (C) polyorganosiloxane, (D) plasticizer, and (E) rubber. Elastomeric EVA compositions, which may be prepared as disclosed in the Brazilian patent BR102012025160-4, incorporated herein in its entirety as reference. The major components of the elastomer composition of the present disclosure as well as their respective properties are detailed below.

(A) EVA Copolymer

Elastomeric EVA compositions in accordance may incorporate one or more ethylene-vinyl acetate (EVA) copolymers prepared by the copolymerization of ethylene and vinyl acetate. In some embodiments, the EVA copolymer can be derived from fossil or renewable sources such as biobased EVA. Biobased EVA is an EVA wherein at least one of ethylene and/or vinyl acetate monomers are derived from renewable sources, such as ethylene derived from biobased ethanol.

EVA copolymers in accordance with the present disclosure may include a percent by weight (wt %) of vinyl acetate as determined according to ASTM D5594 that ranges from a lower limit selected from one of 8 wt %, 12 wt %, and 18 wt % to an upper limit selected from 28 wt %, 33 wt %, and 40 wt %, where any lower limit may be paired with any upper limit.

EVA copolymer in accordance with the present disclosure may include a percent by weight (wt %) of ethylene that ranges from a lower limit selected from one of 60 wt %, 66 wt %, and 72 wt %, to an upper limit selected from one of 82 wt %, 88 wt %, and 92 wt %, where any lower limit may be paired with any upper limit.

EVA copolymer in accordance with the present disclosure may have a melt flow index (MFI) at 190° C. and 2.16 kg as determined according to ASTM D1238 in a range having a lower limit selected from any of 1 g/10 min, 2 g/10 min, 3 g/10 min, and 4 g/10 min, to an upper limit selected from any of 10 g/10 min, 20 g/10 min, 30 g/10 min, and 45 g/10 min, where any lower limit may be paired with any upper limit.

EVA copolymer in accordance with the present disclosure may have a density determined according to ASTM D792 in a range having a lower limit selected from any of 0.80 g/cm$^3$, 0.85 g/cm$^3$, and 0.90 g/cm$^3$, to an upper limit selected from any of 0.93 g/cm$^3$, 0.94 g/cm$^3$, and 0.98 g/cm$^3$, where any lower limit may be paired with any upper limit.

Elastomeric EVA compositions in accordance with the present disclosure may contain an EVA copolymer at a percent by weight (wt %) of the composition that ranges from a lower limit of 20 wt % or 50 wt %, to an upper limit of 80 wt % or 90 wt %, where any lower limit may be paired with any upper limit.

(B) Ethylene Alpha-Olefin Copolymer

Elastomeric EVA compositions in accordance may incorporate one or more copolymers prepared from the polymerization of ethylene and a C3 to C20 alpha-olefin.

Ethylene alpha-olefin copolymer in accordance with the present disclosure may have a hardness determined in accordance with ASTM D2240 in a range having a lower limit selected from any of 10 Shore A, 15 Shore A, and 20 Shore A, to an upper limit selected from any of 70 Shore A, 75 Shore A, and 80 Shore A, where any lower limit may be paired with any upper limit.

Ethylene alpha-olefin copolymer in accordance with the present disclosure may have a density determined according to ASTM D792 in a range having a lower limit selected from any of 0.80 g/cm$^3$, 0.85 g/cm$^3$, and 0.88 g/cm$^3$, to an upper limit selected from any of 0.89 g/cm$^3$, 0.90 g/cm$^3$, and 0.95 g/cm$^3$, where any lower limit may be paired with any upper limit.

Ethylene alpha-olefin copolymer in accordance with the present disclosure may have a melt flow index (MFI) at 190° C. and 2.16 kg as determined according to ASTM D1238 in a range having a lower limit selected from any of 0.01 g/10 min, 0.05 g/10 min, and 0.1 g/10 min, to an upper limit selected from any of 70 g/10 min, 75 g/10 min, and 100 g/10 min, where any lower limit may be paired with any upper limit.

Elastomeric EVA compositions in accordance with the present disclosure may contain an ethylene alpha-olefin copolymer at a percent by weight (wt %) of the composition that ranges from a lower limit of 5 wt % or 10 wt %, to an upper limit of 30 wt % or 60 wt %, where any lower limit may be paired with any upper limit.

(C) Polyorganosiloxane

Elastomeric EVA compositions in accordance may incorporate a polyorganosiloxane. In one or more embodiments, suitable polyorganosiloxanes include a linear chain, branched, or three-dimensional structure, wherein the side groups can include one or more of methyl, ethyl, propyl groups, vinyl, phenyl, hydrogen, amino, epoxy, or halogen substituents. The terminal groups of the polyorganosiloxane may include hydroxyl groups, alkoxy groups, trimethylsilyl, dimethyldiphenylsilyl, and the like. Polyorganosiloxanes in accordance with the present disclosure may include one or more of dimethylpolysiloxane, methylpolysiloxane, and the like.

Elastomeric EVA compositions in accordance with the present disclosure may contain a polyorganosiloxane having a viscosity measured at 25° C. according to ASTM D4287 that ranges from a lower limit of 20 cP or 40 cP, to an upper limit of 700,000 cP or 900,000 cP, where any lower limit may be paired with any upper limit.

Elastomeric EVA compositions in accordance with the present disclosure may contain a polyorganosiloxane at a percent by weight (wt %) of the composition that ranges from a lower limit of 0.1 wt % or 0.5 wt %, to an upper limit of 5 wt % or 10 wt %, where any lower limit may be paired with any upper limit.

(D) Plasticizer

Elastomeric EVA compositions in accordance may incorporate a plasticizer to improve the processability and adjust the hardness of the elastomeric EVA. Plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers.

Elastomeric EVA compositions in accordance with the present disclosure may contain a plasticizer at a percent by weight (wt %) of the composition that ranges from a lower limit of 0.5 wt % or 2 wt %, to an upper limit of 10 wt % or 20 wt %, where any lower limit may be paired with any upper limit.

(E) Rubber

Elastomeric EVA compositions in accordance may incorporate a rubber component to increase the rubbery touch and increase the coefficient of friction, depending on the end application. Rubbers in accordance with the present disclosure may include one or more of natural rubber, polyisoprene (IR), styrene and butadiene rubber (SBR), polybutadiene, nitrile rubber (NBR); polyolefin rubbers such as ethylene-propylene rubbers (EPDM, EPM), and the like, acrylic rubbers, halogen rubbers such as halogenated butyl rubbers including brominated butyl rubber and chlorinated butyl rubber, brominated isotubylene, polychloroprene, and the like; silicone rubbers such as methylvinyl silicone rubber, dimethyl silicone rubber, and the like, sulfur-containing rubbers such as polysulfidic rubber; fluorinated rubbers; thermoplastic rubbers such as elastomers based on styrene, butadiene, isoprene, ethylene and propylene, styrene-isoprene-styrene (SIS), styrene-ethylene-butylene-styrene (SEBS), styrene-butylene-styrene (SBS), and the like, ester-based elastomers, elastomeric polyurethane, elastomeric polyamide, and the like.

Rubbers in accordance with the present disclosure may have a hardness determined in accordance with ASTM D2240 in a range having a lower limit selected from any of 10 Shore A, 15 Shore A, and 20 Shore A, to an upper limit selected from any of 45 Shore A, 50 Shore A, and 55 Shore A, where any lower limit may be paired with any upper limit.

Elastomeric EVA compositions in accordance with the present disclosure may contain a rubber at a percent by weight (wt %) of the composition that ranges from a lower limit of 0.5 wt % or 1 wt %, to an upper limit of 20 wt % or 40 wt %, where any lower limit may be paired with any upper limit.

In one or more embodiments, the elastomeric EVA composition may have a melt flow index (MFI) at 190° C. and 2.16 kg as determined according to ASTM D1238 in a range having a lower limit selected from any of 6.1 g/10 min, 8 g/10 min, 9 g/10 min, and 10 g/10 min, to an upper limit selected from any of 10 g/10 min, 12 g/10 min, 20 g/10 min, 30 g/10 min, 43 g/10 min, and 45 g/10 min, where any lower limit may be paired with any upper limit. A higher melt flow index allows the improvement of the mixture homogenization and the processability of the polymers in the presence of fillers due to the lower viscosity, allowing a better dispersion of all components of the polymer composition.

In one or more embodiments, the elastomeric EVA has a density determined according to ASTM D792 in a range having a lower limit selected from any of 0.9 g/cm$^3$, 0.91 g/cm$^3$, 0.92 and g/cm$^3$, to an upper limit selected from any of 0.93 g/cm$^3$, 0.94 g/cm$^3$, 0.95 g/cm$^3$, and 0.98 g/cm$^3$, where any lower limit may be paired with any upper limit.

In one or more embodiments, polymeric compositions in accordance with the present disclosure may contain elastomeric EVA composition at a percent by weight (wt %) of the polymer composition that ranges from a lower limit selected from one of 25 wt %, 29 wt % 33 wt %, 37 wt %, 42 wt %, 46 wt %, and 50 wt %, to an upper limit selected from one of 63 wt %, 67 wt %, 71 wt %, 75 wt %, 79 wt %, and 84 wt %, where any lower limit can be used with any upper limit.

Base Polymer

Polymeric compositions in accordance to the present disclosure may include as an option one or more base polymers that are combined with the elastomeric EVA composition to create a polymer composition tailored to a variety of target applications.

In one or more embodiments, the base polymer may be selected from polymers such as ethylene vinyl acetate copolymer (EVA), polyethylene, polypropylene, polystyrene, polyurethane, elastomers as 5-vinyl-2-norbornene-EPDM, polysulfide rubber, ethylene propylene rubber (EPM), poly (ethylene-methyl acrylate), poly(ethylene-acrylate), ethylene propylene diene rubber (EPDM), vinyl silicone rubber (VMQ), fluorosilicone (FVMQ), nitrile rubber (NBR), acrylonitrile-butadiene-styrene (ABS), styrene butadiene rubber (SBR), styrene-butadiene-styrene block copolymers (SBS), styrene-ethylene-butylene-styrene triblock copolymer (SEBS), polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber, polychloropropene, bromobutyl rubber, chlorobutyl rubber, chlorinated poly(ethylene), vinylidene fluoride copolymers, silicone rubber, vinyl silicone rubber, chlorosulgonated poly(ethylene), fluoroelastomer, elastomeric polyolefins as ethylene C3-C12 alpha olefin copolymers, ethylene-butylene copolymer, ethylene-hexene copolymer, ethylene-octene copolymer, and combinations thereof.

The base polymer may be one or more EVA copolymers in some embodiments. In particular embodiments, EVA copolymers may be HM728, 3019PE, 8019PE, PN2021, HM150 and combinations thereof, which are commercially available by Braskem. In some embodiments, the EVA can be derived from fossil or renewable sources such as biobased EVA. Biobased EVA is an EVA wherein at least one of ethylene and/or vinyl acetate monomers are derived from renewable sources, such as ethylene derived from biobased ethanol.

EVA base polymers in accordance with the present disclosure may include an amount of vinyl acetate monomer as a percent by weight of the EVA copolymer (wt %) that ranges from a lower limit selected from one of 5 wt %, 8 wt %, and 12 wt %, and 20 wt % to an upper limit selected from 25 wt %, 33 wt %, and 40 wt %, where any lower limit may be paired with any upper limit.

In one or more embodiments, the base polymer may have a melt flow index (MFI) at 190° C. and 2.16 kg as determined according to ASTM D1238 in a range having a lower limit selected from any of 1 g/10 min, 2.5 g/10 min, and 5 g/10 min, to an upper limit selected from any of 10 g/10 min, 20 g/10 min, 30 g/10 min, and 44 g/10 min, where any lower limit may be paired with any upper limit.

In one or more embodiments, the base polymer may have a Mooney Viscosity as determined by ASTM D1646 at 125° C. (when applicable such as when a polymer composition contains a rubber) in a range having a lower limit selected from any of 5, 10, and 15 ML 1+4, to an upper limit selected from any of 50, 100, and 150 ML 1+4, where any lower limit may be paired with any upper limit.

In one or more embodiments, polymeric compositions in accordance with the present disclosure may contain one or more base polymers at a percent by weight (wt %) of the polymer composition that ranges from a lower limit selected from one of 4.3 wt %, 17 wt %, 26 wt %, 31 wt %, and 35 wt %, to an upper limit selected from one of 39 wt % 44 wt % 48 wt %, 52 wt % 57 wt %, and 61 wt %, where any lower limit can be used with any upper limit.

Filler

Polymeric compositions in accordance with the present disclosure may be loaded with fillers that may include carbon black, silica powder, calcium carbonate, talc, titanium dioxide, clay, polyhedral oligomeric silsesquioxane (POSE), metal oxide particles and nanoparticles, inorganic salt particles and nanoparticles, recycled EVA, and mixtures thereof.

As defined herein, recycled EVA may be derived from regrind materials that have undergone at least one processing method such as molding or extrusion and the subsequent sprue, runners, flash, rejected parts, and the like, are ground or chopped.

In one or more embodiments, polymeric compositions in accordance with the present disclosure one or more fillers at a percent by weight (wt %) of the polymer composition that ranges from a lower limit selected from one of 4 wt %, 8 wt %, 12 wt %, 15 wt %, 18 wt %, 22%, and 27 wt %, to an upper limit selected from one of 35 wt %, 42 wt %, 47 wt %, 52 wt %, 56 wt %, and 59 wt % where any lower limit can be used with any upper limit.

Peroxide Agent

Polymeric compositions in accordance with the present disclosure may include one or more peroxide agents capable of generating free radicals during the polymer processing to promote curing. Peroxide agents may include benzoyl peroxide, dicumyl peroxide, di-tert-butyl peroxide, tert-butyl cumyl peroxide, tert-butyl 3,5,5-trimethylhexanoate peroxide, tert-butyl peroxybenzoate, 2-ethylhexyl carbonate tert-butyl peroxide, 2,5-dimethyl-2,5-di (tert-butylperoxide) hexane, 1,1-di(tert-butylperoxide)-3,3,5-trimethylcyclohexane, 2,5-dimethyl-2,5-di(tertbutylperoxide), hexyne-3,3, 3,5,7,7-pentamethyl-1,2,4-trioxepane, butyl 4,4-di (tert-butylperoxide) valerate, di (2,4-dichlorobenzoyl) peroxide, di(4-methylbenzoyl) peroxide, peroxide di(tert-butylperoxyisopropyl) benzene, 2,5-di(cumylperoxy)-2,5-dimethyl hexane, 2,5-di(cumylperoxy)-2,5-dimethyl hexyne-3,4-methyl-4-(t-butylperoxy)-2-pentanol, 4-methyl-4-(t-amylperoxy)-2-pentanol, 4-methyl-4-(cumylperoxy)-2-pentanol. 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3,2,5-dimethyl-2,5-di(t-amylperoxy) hexyne-3,2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-hydroperoxyhexane, m/p-alpha, alpha-di[(t-butylperoxy) isopropyl]benzene, 1,3,5-tris(t-butylperoxyisopropyl) benzene, 1,3,5-tris(t-amylperoxyisopropyl)benzene, 1,3,5- tris(cumylperoxyisopropyl)benzene, di[1,3-dimethyl-3-(t-butylperoxy)butyl]carbonate, di[1,3-dimethyl-3-(t-amylperoxy) butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl]benzene, 1,3-dimethyl-3-(t-butylperoxy)butanol, 1,3-dimethyl-3-(t-amylperoxy)butanol, di(2-phenoxyethyl) peroxydicarbonate, di(4-t-butylcyclohexyl) peroxydicarbonate, dimyristyl peroxydicarbonate, dibenzyl peroxydicarbonate, di(isobornyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl)1-methylethyl}carbamate, 1,3-dimethyl-3-(t-amylperoxy)butyl N-[1-{3(1-methylethenyl)-phenyl}-1-methylethyl] carbamate, 1,3-dimethyl-3-(cumylperoxy))butyl N-[1-{3-(1-methylethenyl)-phenyl}-1-methylethyl]carbamate, 1,1-di(t-butylperoxy)-3,3,5-trimethylcyclohexane, 1,1-di(t-butylperoxy)cyclohexane, n-butyl 4,4-di(t-amylperoxy) valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-buty 1-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6,9,9-hexamethyl-1,2,4,5-tetraoxacyclononane, 2,5-dimethyl-2,5-di(benzoylperoxy)hexane, t-butyl perbenzoate, t-butylperoxy acetate, t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl)monoperoxy carbonate, 1,1,1-tris[2-(t-butylperoxy-carbonyloxy)ethoxymethyl]propane, 1,1,1-tris[2-(t-amylperoxy-carbonyloxy)ethoxymethyl]propane, 1,1,1-tris[2-(cumylperoxy-carbonyloxy)ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide and combinations thereof.

In one or more embodiments, polymeric compositions in accordance with the present disclosure may contain one or more peroxide agents at a percent by weight (wt %) of the polymer composition of that ranges from a lower limit selected from one of 0.4 wt %, 0.65 wt %, 0.85 wt %, 1.27 wt %, and 1.7 wt %, to an upper limit selected from one of 2 wt %, 2.3 wt % 2.5 wt %, 2.9 wt %, 3.5 wt %, and 4.2 wt %, where any lower limit can be used with any upper limit.

Blowing Agent

Polymeric compositions in accordance with the present disclosure may include one or more blowing agents to produce expanded polymeric compositions and foams. Blowing agents may include solid, liquid, or gaseous blowing agents. In embodiments utilizing solid blowing agents, blowing agents may be combined with a polymer composition as a powder or granulate.

Blowing agents in accordance with the present disclosure include chemical blowing agents that decompose at polymer processing temperatures, releasing the blowing gases such as $N_2$, $CO$, $CO_2$, and the like. Examples of chemical blowing agents may include organic blowing agents, including hydrazines such as toluenesulfonyl hydrazine, hydrazides such as oxydibenzenesulfonyl hydrazide, diphenyl oxide-4,4'-disulfonic acid hydrazide, and the like, nitrates, azo compounds such as azodicarbonamide, cyanovaleric acid, azobis(isobutyronitrile), and N-nitroso compounds and other nitrogen-based materials, and other compounds known in the art.

Inorganic chemical blowing agents may include carbonates such as sodium hydrogen carbonate (sodium bicarbonate), sodium carbonate, potassium bicarbonate, potassium carbonate, ammonium carbonate, and the like, which may be used alone or combined with weak organic acids such as citric acid, lactic acid, or acetic acid.

In one or more embodiments, polymeric compositions in accordance with the present disclosure may contain one or more blowing agents at a percent by weight (wt %) of the polymer composition that ranges from a lower limit selected from one of 0.9 wt %, 1.3 wt %, 1.7 wt %, 2.1 wt %, and 2.5 wt %, to an upper limit selected from one of 2.9 wt %, 3.3 wt %, 3.7 wt %, 4.1 wt %, 4.5 wt %, and 5 wt %, where any lower limit can be used with any upper limit.

Blowing Accelerators

Polymeric compositions in accordance with the present disclosure may include one or more blowing accelerators (also known as kickers) that enhance or initiate the action of a blowing agent by lower the associated activation temperature. For example, blowing accelerators may be used if the selected blowing agent reacts or decomposes at temperatures higher than 170° C., such as 220° C. or more, where the surrounding polymer would be degraded if heated to the activation temperature. Blowing accelerators may include any suitable blowing accelerator capable of activating the selected blowing agent. In one or more embodiments, suitable blowing accelerators may include cadmium salts, cadmium-zinc salts, lead salts, lead-zinc salts, barium salts, barium-zinc (Ba—Zn) salts, zinc oxide, titanium dioxide, triethanolamine, diphenylamine, sulfonated aromatic acids and their salts, and the like.

In one or more embodiments, polymeric compositions in accordance with the present disclosure may contain one or more blowing accelerators at a percent by weight (wt %) of the polymer composition that ranges from a lower limit selected from one of 0.08 wt %, 0.2 wt %, 0.4 wt %, 0.8 wt %, 1.65 wt %, and 2 wt %, to an upper limit selected from one of 2 wt % 2.5 wt %, 2.8 wt %, 3.25 wt %, 3.6 wt %, and 4 wt %, where any lower limit can be used with any upper limit.

Additives

Polymeric compositions in accordance with the present disclosure may include additives that modify various physical and chemical properties when added to the polymeric composition during blending that include one or more polymer additives such as processing aids, lubricants, antistatic agents, clarifying agents, nucleating agents, beta-nucleating agents, slipping agents, antioxidants, compatibilizers, antacids, light stabilizers such as HALS, IR absorbers, whitening agents, inorganic fillers, organic and/or inorganic dyes, anti-blocking agents, processing aids, flame-retardants, plasticizers, biocides, adhesion-promoting agents, metal oxides, mineral fillers, glidants, oils, antioxidants, antiozonants, accelerators, and vulcanizing agents.

Preparation

Polymeric compositions in accordance with the present disclosure may be prepared in any conventional mixture device. In one or more embodiments, polymeric compositions may be prepared by mixture in conventional kneaders, banbury mixers, mixing rollers, single, twin, or multi screw extruders, and the like, in conventional EVA processing conditions and subsequently cured and expanded in conventional expansion processes, such as injection molding or compression molding.

In one or more embodiments, components of the elastomeric EVA composition may be combined at a temperature in the range of 70° C. and 190° C. and for a time in the range of 1 to 25 minutes, prior to combination with the other components to produce a polymer composition in accordance with the present disclosure. For example, the components of the elastomeric EVA may be combined and processed into a polymer resin prior to a second step of combining with a base polymer, filler, and/or peroxide agent.

Physical Properties

Polymer compositions in accordance with the present disclosure may have good performance as a replacement for rubber materials with acceptable performance at high and low temperatures, with little or no odor, and comparable or lower density to standard rubber formulations. In one or more embodiments, polymer compositions may exhibit high flexibility, suitable hardness, good abrasion resistance, high coefficient of friction, and rubberized touch. In some embodiments, articles prepared from polymer compositions in accordance with the present disclosure may take the form of expanded or non-expanded polymer structures.

Expanded articles prepared by the polymer compositions in accordance with the present disclosure may have a hardness as determined by ASTM D2240 within a range having a lower limit selected from one of 10, 15, 20, 45, and 50 Shore A, to an upper limit selected from one of 27, 35, 50, and 60 Shore A, where any lower limit may be paired with any upper limit.

Expanded articles prepared by the polymer compositions in accordance with the present disclosure may have a density as determined by ASTM D-792 within a range having a lower limit selected from one of 0.12 g/cm$^3$, 0.2 g/cm$^3$, 0.25 g/cm$^3$, 0.5 g/cm$^3$, and 0.15 g/cm$^3$, to an upper limit selected from one of 0.4 g/cm$^3$, 0.5 g/cm$^3$, 0.6 g/cm$^3$, 0.65 g/cm$^3$, 0.80 g/cm$^3$ and 1.0 g/cm$^3$, where any lower limit may be paired with any upper limit.

Expanded articles prepared by the polymer compositions in accordance with the present disclosure may have a shrinkage at 70° C.*1 h using the PFI method (PFI "Testing and Research Institute for the Shoe Manufacturing Industry" in Pirmesens-Germany) within a range having a lower limit selected from one of 0.1%, 1%, 1.5%, and 5% to an upper limit selected from one of 4%, 5%, 6%, and 8%, where any lower limit may be paired with any upper limit.

Expanded articles prepared by the polymer compositions in accordance with the present disclosure may have a permanent compression set (PCS) as determined by ASTM D395 method B within a range having a lower limit selected from one of 10%, 20%, and 40% to an upper limit selected from one of 50%, 60%, and 70%, where any lower limit may be paired with any upper limit.

Expanded articles prepared by the polymer compositions in accordance with the present disclosure may have a rebound as determined by ASTM D3574 within a range having a lower limit selected from one of 20%, 30%. 35%, 40%, 45%, and 50% to an upper limit selected from one of 50%, 60%, 70%, 80% and 90%, where any lower limit may be paired with any upper limit.

Expanded articles prepared by the polymer compositions in accordance with the present disclosure may have an abrasion resistance as determined by DIN 53516 with a testing load of 10N within a range having a lower limit selected from one of 100 mm$^3$, 150 mm$^3$, 200 mm$^3$, 450 mm$^3$, 500 mm$^3$, and 650 mm$^3$, to an upper limit selected from one of 300 mm$^3$, 600 mm$^3$, 700 mm$^3$, 800 mm$^3$, where any lower limit may be paired with any upper limit.

Applications

Polymer compositions in accordance with the present disclosure may exhibit similar or improved properties when compared to standard rubbers or unmodified EVA copolymers. In one or more embodiments, polymeric compositions may be used in a number of molding processes including extrusion molding, injection molding, compression molding, thermoforming, foaming, pultrusion, 3D printing, and the like, to produce manufactured articles.

Polymeric compositions in accordance with the present disclosure may be formed into articles used for a diverse array of end-uses including shoe soles, midsoles, outsoles, unisoles, insoles, monobloc sandals and flip flops, full EVA footwear, sportive articles, and the like.

Examples

In the following example, a polymeric composition formulation was prepared and assayed to study various physical properties. Polymer formulation is shown in Table 1, where VA1518A is an elastomeric EVA commercially available by Braskem, and having an MFI of approximately 14-15 g/10 min (190° C.@2.16 kg) as measured according to ASTM D1238, and a density of 0.928 g/cm$^3$. The base polymer was HM728, an ethylene vinyl acetate copolymer commercially available by Braskem and having 28 wt % vinyl acetate, a MFI of 6.0 g/10 min (190° C.@2.16 kg) as measured according to ASTM D1238, a density 0.950 g/cm$^3$; and a hardness 80 Shore A as measured according to ASTM D2240.

TABLE 1

Sample formulations assayed.

| Composition, wt % | F1 |
| --- | --- |
| VA1518A | 38.0 |
| HM728 | 5.7 |
| Calcium carbonate (filler) | 21.8 |
| Zinc Oxide (blowing accelerator) | 1.5 |
| Azodicarbonamide (blowing agent) | 1.5 |
| 1,4-di (2-terc-butil isopropil) benzene (curing agent) | 0.9 |
| Recycled EVA | 30.6 |

Samples were assayed for hardness, rebound, shrinkage, density, compression set, and abrasion resistance and the results are shown in Table 2.

TABLE 2

Various physical properties for sample formulations assayed

| Parameter | Units | F1 |
| --- | --- | --- |
| Hardness | Shore A | 32 |
| Rebound | % | 48 |

TABLE 2-continued

Various physical properties for sample formulations assayed

| Parameter | Units | F1 |
|---|---|---|
| Shrinkage (1 h*70° C.) | % | 3.8 |
| Density | g/cm³ | 0.316 |
| Abrasion resistance (10N) | mm³ | 284 |
| Compression Set | % | 50 |

Table 3 presents further formulations with different base polymers.

TABLE 3

Polymer composition formulations with different base polymers

| | Composition (wt %) | | | | |
|---|---|---|---|---|---|
| Components | F2 | F3 | F4 | F5 | F6 |
| VA1518A | 75.85 | 75.65 | 75.46 | 75.65 | 75.65 |
| SBR1502 | 11.33 | — | — | — | — |
| Keltan 6950 | — | 11.3 | — | — | — |
| High CIS Polybutadiene Rubber (CB24) | — | — | 11.27 | — | — |
| Nitrile Rubber | — | — | — | 11.30 | — |
| Natural rubber | — | — | — | — | 11.30 |
| Calcium carbonate (filler) | 8.72 | 8.70 | 8.67 | 8.70 | 8.70 |
| Zinc Oxide (blowing accelerator) | 0.87 | 0.87 | 0.87 | 0.87 | 0.87 |
| Stearine | 0.44 | 0.43 | 0.43 | 0.43 | 0.43 |
| Peroxide agent 802G | 1.57 | 1.74 | 1.73 | 1.74 | 1.74 |
| Azodicarbonamide (blowing agent) | 1.22 | 1.30 | 1.56 | 1.30 | 1.30 |

Samples of Table 3 were assayed for hardness, rebound, shrinkage, density, compression set, and abrasion resistance and the results are shown in Table 4.

TABLE 4

Various physical properties for sample formulations assayed

| Parameter | Units | F2 | F3 | F4 | F5 | F6 |
|---|---|---|---|---|---|---|
| Hardness | Asker C | 45 | 44 | 40 | 44 | 39 |
| Hardness | Shore A | 22 | 21 | 18 | 21 | 19 |
| Density | g/cm³ | 0.266 | 0.262 | 0.248 | 0.278 | 0.241 |
| Shrinkage | % | 1.3 | 2.5 | 2.8 | 2.3 | 2 |
| Rebound | % | 57 | 61 | 63 | 58 | 60 |
| Abrasion | Mm³ | 601 | 413 | 565 | 597 | 360 |
| Compression Set | % | 51 | 53 | 52 | 44 | 63 |

Although only a number of embodiments have been described in detail above, those skilled in the art will readily appreciate that many modifications are possible in the examples without materially departing from this subject disclosure. Accordingly, all such modifications are intended to be included within the scope of this disclosure as defined in the following claims.

The invention claimed is:

1. An expanded polymer composition for footwear, the expanded polymer composition being prepared from a polymer composition, the polymer composition comprising:
   an elastomeric ethylene-vinyl acetate (EVA) composition;
   a blowing agent; and
   optionally one or more selected from a group consisting of a base polymer, filler, peroxide agent, and blowing accelerator,
   wherein the elastomeric EVA composition has a melt flow index (MFI) at 190° C. and 2.16 kg as determined according to ASTM D1238 in the range of 6.1 g/10 min and 45 g/10 min,
   wherein the elastomeric EVA composition comprises:
      (A) an EVA copolymer at a percent by weight in the range of 20 wt % to 90 wt %;
      (B) an ethylene alpha-olefin copolymer at a percent by weight in the range of 5% to 60%;
      (C) a polyorganosiloxane at a percent by weight in the range of 0.1 wt % to 10 wt %; and
      (D) a plasticizer at a percent by weight in the range of 0.5 wt % to 20 wt %; and
      (E) a rubber at a percent by weight in the range of 0.5 wt % to 40 wt %,
   wherein the expanded polymer composition exhibits a density as determined by ASTM D-792 within a range of 0.25 g/cm³ to 1.0 g/cm³.

2. The expanded polymer composition of claim 1, wherein the EVA copolymer comprises vinyl acetate at a percent by weight of the EVA copolymer that ranges from 8 wt % to 40 wt %.

3. The expanded polymer composition of claim 1, wherein the ethylene alpha-olefin copolymer is prepared from a C3 to C20 alpha-olefin monomer.

4. The expanded polymer composition of claim 1, wherein the polymer composition comprises elastomeric EVA composition at a percent by weight (wt %) of the polymer composition that ranges from 25 wt % to 84 wt %.

5. The expanded polymer composition of claim 1, wherein the polymer composition comprises filler at a percent by weight (wt %) of the polymer composition that ranges from 4 wt % to 59 wt %.

6. The expanded polymer composition of claim 1, wherein the polymer composition comprises blowing agent at a percent by weight (wt %) of the polymer composition that ranges from 0.9 wt % to 5 wt %.

7. The expanded polymer composition of claim 1, wherein the polymer composition comprises peroxide agent at a percent by weight (wt %) of the polymer composition that ranges from 0.4 wt % to 4.2 wt %.

8. The expanded polymer composition of claim 1, wherein the polymer composition comprises blowing accelerator at a percent by weight (wt %) of the polymer composition that ranges from 0.08 wt % to 4 wt %.

9. The expanded polymer composition of claim 1, wherein the expanded polymer composition exhibits a hardness as determined by ASTM D2240 in the range of 10 to 60 Shore A.

10. The expanded polymer composition of claim 1, wherein the expanded polymer composition exhibits a shrinkage according to the PFI method in the range of 0.1% to 8%.

11. The expanded polymer composition of claim 1, wherein the expanded polymer composition exhibits a permanent compression set as determined by ASTM D395 method B in the range of 10% to 70%.

12. The expanded polymer composition of claim 1, wherein the expanded polymer composition exhibits a rebound as determined by ASTM D3574 within the range of 20% to 90%.

13. The expanded polymer composition of claim 1, wherein the expanded polymer composition is exhibits an abrasion resistance as determined by DIN 53516 within the range 100 mm$^3$ to 800 mm$^3$.

14. An article prepared from the expanded polymer composition of claim 1.

15. The article of claim 14, wherein the article is selected from a group consisting of shoe soles, midsoles, outsoles, unisoles, insoles, monobloc sandals, flip flops, and full EVA footwear.

16. A method for preparing the expanded article of claim 1, comprising:
    blending a polymer composition from a mixture comprising:
        an elastomeric ethylene-vinyl acetate (EVA) composition,
        a blowing agent, and
        optionally one or more selected from a group consisting of a base polymer, filler, peroxide agent, and blowing accelerator,
    curing and expanding the polymer composition,
    wherein the elastomeric EVA has a melt flow index (MFI) at 190° C. and 2.16 kg as determined according to ASTM D1238 in the range of 6.1 g/10 min and 45 g/10 min,
    wherein the elastomeric EVA composition comprises:
        (A) an EVA copolymer at a percent by weight in the range of 20 wt % to 90 wt %;
        (B) an ethylene alpha-olefin copolymer at a percent by weight in the range of 5% to 60%;
        (C) a polyorganosiloxane at a percent by weight in the range of 0.1 wt % to 10 wt %; and
        (D) a plasticizer at a percent by weight in the range of 0.5 wt % to 20 wt %; and
        (E) a rubber at a percent by weight in the range of 0.5 wt % to 40 wt %,
    wherein the expanded polymer composition exhibits the density as determined by ASTM D-792 within the range of 0.25 g/cm$^3$ to 1.0 g/cm$^3$.

17. The method of claim 16, wherein the elastomeric EVA composition is prepared by combining components (A)-(E) at a temperature in the range of 50° C. and 130° C. and for a time in the range of 1 to 25 minutes.

18. The method of claim 16, wherein blending the polymer composition comprises processing the mixture using a kneader, banbury mixer, mixing roller, or twin screw extruder.

* * * * *